(12) United States Patent
Mortellite et al.

(10) Patent No.: US 6,740,184 B2
(45) Date of Patent: *May 25, 2004

(54) HIGH SPEED METHOD OF MAKING PLASTIC FILM AND NONWOVEN LAMINATES

(75) Inventors: Robert M. Mortellite, Maineville, OH (US); Thomas G. Mushaben, Cincinnati, OH (US); Pai-Chuan Wu, Cincinnati, OH (US)

(73) Assignee: Clopay Plastic Products Company, Inc., Cincinnati, OH (US)

( * ) Notice: Subject to any disclaimer, the term of this patent is extended or adjusted under 35 U.S.C. 154(b) by 6 days.

This patent is subject to a terminal disclaimer.

(21) Appl. No.: 10/272,742

(22) Filed: Oct. 17, 2002

(65) Prior Publication Data

US 2003/0041952 A1 Mar. 6, 2003

Related U.S. Application Data

(63) Continuation of application No. 09/395,627, filed on Sep. 14, 1999, now abandoned.

(51) Int. Cl.$^7$ .............................................. B29C 55/12
(52) U.S. Cl. ............... 156/229; 156/244.27; 156/308.2; 156/324; 264/288.4; 264/290.2; 264/414
(58) Field of Search .............. 156/229, 244.27, 156/308.2, 324, 244.11, 309.9; 264/288.4, 290.2, 414

(56) References Cited

U.S. PATENT DOCUMENTS

| | | | |
|---|---|---|---|
| 2,714,571 A | 8/1955 | Irion et al. .................. 154/139 |
| 3,058,868 A | 10/1962 | Schroeder .................. 156/153 |
| 3,622,422 A | 11/1971 | Newman .................... 156/306 |
| 3,832,267 A | 8/1974 | Liu ............................ 161/116 |
| 4,153,664 A | 5/1979 | Sabee ........................ 264/289 |
| 4,379,197 A | 4/1983 | Cipriani et al. ............. 428/220 |
| 4,452,845 A | 6/1984 | Lloyd et al. ................ 428/220 |
| 4,472,328 A | 9/1984 | Sugimoto et al. ............. 264/41 |
| 4,486,377 A | 12/1984 | Lucchesi et al. ............ 264/510 |
| 4,517,714 A | 5/1985 | Sneed et al. ................. 28/103 |
| 4,522,203 A | 6/1985 | Mays ......................... 128/132 |
| 4,596,738 A | 6/1986 | Metcalfe et al. ......... 428/308.4 |
| 4,608,221 A | 8/1986 | Kurtz et al. ................ 264/556 |
| 4,614,679 A | 9/1986 | Farrington, Jr. et al. .... 428/138 |
| 4,626,574 A | 12/1986 | Cancio et al. .............. 525/240 |
| 4,678,417 A | 7/1987 | Upmeier .................. 425/72 R |
| 4,692,368 A | 9/1987 | Taylor et al. ............... 428/137 |
| 4,705,812 A | 11/1987 | Ito et al. ...................... 521/92 |
| 4,705,813 A | 11/1987 | Ito et al. ...................... 521/92 |
| 4,718,178 A | 1/1988 | Whipple ...................... 34/156 |
| 4,725,473 A | 2/1988 | Van Gompel ............... 428/156 |
| 4,728,277 A | 3/1988 | Planeta ..................... 425/72.1 |
| 4,753,840 A | 6/1988 | Van Gompel ............... 428/171 |
| 4,777,073 A | 10/1988 | Sheth ......................... 428/155 |
| 4,779,355 A | 10/1988 | Petros .......................... 34/23 |

(List continued on next page.)

FOREIGN PATENT DOCUMENTS

| | | |
|---|---|---|
| EP | 141592 | 5/1985 |
| JP | 57137361 | 2/1984 |

OTHER PUBLICATIONS

Schwarz, Eckhard C. A., *New Fibrillated Film Structures, Manufacture and Uses*, Pap. Synth. Conf. (TAPPI), 1976, pp. 33–39.

Primary Examiner—Sam Chuan Yao
(74) Attorney, Agent, or Firm—Wood, Herron & Evans, L.L.P.

(57) ABSTRACT

Thermoplastic film, microporous film, and laminates thereof, are made at high speeds on the order of about 500 fpm to about 1200 fpm. Bond strengths of film and nonwoven laminates are effectively controlled by air cooling devices which cause the air to flow substantially parallel to the extruded web during drawdown and provide a plurality of cooling air vortices to effectively cool the web. Film gauge control is also achieved by the method.

21 Claims, 2 Drawing Sheets

U.S. PATENT DOCUMENTS

| | | | |
|---|---|---|---|
| 4,814,124 A | 3/1989 | Aoyama et al. | 264/41 |
| 4,921,652 A | 5/1990 | Tsuji et al. | 264/41 |
| 4,921,653 A | 5/1990 | Aoyama et al. | 264/41 |
| 5,009,831 A | 4/1991 | Turi | 264/510 |
| 5,035,941 A | 7/1991 | Blackburn | 428/286 |
| 5,200,247 A | 4/1993 | Wu et al. | 428/131 |
| 5,202,173 A | 4/1993 | Wu et al. | 428/131 |
| 5,407,979 A | 4/1995 | Wu et al. | 524/47 |
| 5,409,761 A | 4/1995 | Langley | 428/198 |
| 5,865,926 A | 2/1999 | Wu et al. | 156/229 |
| 5,932,497 A | 8/1999 | Morman et al. | 442/286 |
| 6,013,151 A | 1/2000 | Wu et al. | 156/229 |

HIGH SPEED METHOD OF MAKING PLASTIC FILM AND NONWOVEN LAMINATES

RELATED APPLICATIONS

This application is a continuation application of application Ser. No. 09/395,627, filed on Sep. 14, 1999 now abandoned, which is incorporated herein in its entirety by reference.

BACKGROUND OF THE INVENTION

Methods of making plastic film and nonwoven laminates date back many years. For example, more than thirty years ago U.S. Pat. No. 3,484,835 (1968) issued to Trounstine, et al., and it is directed to embossed plastic film having desirable handling characteristics and fabricating useful articles such as diapers. Since that time, many patents have issued in the field. U.S. Pat. No. 5,202,173 issued on Apr. 13, 1993, for an ultra-soft thermoplastic film which was made by incrementally stretching the embossed film to achieve breathability. The film may include fillers. Polymer films of polycaprolactone (PCL) and starch polymer or polyvinyl alcohol (PVOH) upon incremental stretching also produce breathable products, as disclosed in U.S. Pat. Nos. 5,200,247 and 5,407,979. More recently, U.S. Pat. No. 5,865,926 issued for a method of making a cloth-like microporous laminate of a nonwoven fibrous web and thermoplastic film having air and moisture vapor permeabilities with liquid-barrier properties.

Methods of making microporous film products have also been known for some time. For example, U.S. Pat. No. 3,832,267, to Liu, teaches the melt-embossing of a polyolefin film containing a dispersed amorphous polymer phase prior to stretching or orientation to improve gas and moisture vapor transmission of the film. According to the Liu '267 patent, a film of crystalline polypropylene having a dispersed amorphous polypropylene phase is first embossed prior to biaxially drawing (stretching) to produce an oriented imperforate film having greater permeability. The dispersed amorphous phase serves to provide microvoids to enhance the permeability of the otherwise imperforate film to improve moisture vapor transmission (MVT). The embossed film is preferably embossed and drawn sequentially.

In 1976, Schwarz published a paper which described polymer blends and compositions to produce microporous substrates (Eckhard C. A. Schwartz (Biax-Fiberfilm), "New Fibrillated Film Structures, Manufacture and Uses", *Pap. Synth. Conf. (TAPPI)*, 1976, pages 33–39). According to this paper, a film of two or more incompatible polymers, where one polymer forms a continuous phase and a second polymer forms a discontinuous phase, upon being stretched will phase separate thereby leading to voids in the polymer matrix and increasing the porosity of the film. The continuous film matrix of a crystallizable polymer may also be filled with inorganic filler such as clay, titanium dioxide, calcium carbonate, etc., to provide microporosity in the stretched polymeric substrate.

Many other patents and publications disclose the phenomenon of making microporous thermoplastic film products. For example, European patent 141592 discloses the use of a polyolefin, particularly ethylene vinyl acetate (EVA) containing a dispersed polystyrene phase which, when stretched, produces a voided film which improves the moisture vapor permeability of the film. This EP '592 patent also discloses the sequential steps of embossing the EVA film with thick and thin areas followed by stretching to first provide a film having voids which, when further stretched, produces a net-like product. U.S. Pat. Nos. 4,452,845 and 4,596,738 also disclose stretched thermoplastic films where the dispersed phase may be a polyethylene filled with calcium carbonate to provide the microvoids upon stretching. Later U.S. Pat. Nos. 4,777,073; 4,814,124; and 4,921,653 disclose the same processes described by the above-mentioned earlier publications involving the steps of first embossing a polyolefin film containing a filler and then stretching that film to provide a microporous product.

With reference to U.S. Pat. Nos. 4,705,812 and 4,705,813, microporous films have been produced from a blend of linear low density polyethylene (LLDPE) and low density polyethylene (LDPE) with barium sulfate as the inorganic filler having an average particle diameter of 0.1–7 microns. It is also known to modify blends of LLDPE and LDPE with a thermoplastic rubber such as Kraton. Other patents, such as U.S. Pat. No. 4,582,871, disclose the use of thermoplastic styrene block tripolymers in the production of microporous films with other incompatible polymers such as styrene. There are other general teachings in the art such as the disclosures in U.S. Pat. Nos. 4,472,328 and 4,921,652.

Relevant patents regarding extrusion lamination of unstretched nonwoven webs include U.S. Pat. Nos. 2,714,571; 3,058,868; 4,522,203; 4,614,679; 4,692,368; 4,753,840 and 5,035,941. The above '868 and '368 patents disclose stretching extruded polymeric films prior to laminating with unstretched nonwoven fibrous webs at pressure roller nips. The '203 and '941 patents are directed to co-extruding multiple polymeric films with unstretched nonwoven webs at pressure roller nips. The '840 patent discloses preforming nonwoven polymeric fiber materials prior to extrusion laminating with films to improve bonding between the nonwoven fibers and films. More specifically, the '840 patent discloses conventional embossing techniques to form densified and undensified areas in nonwoven base plies prior to extrusion lamination to improve bonding between nonwoven fibrous webs and films by means of the densified fiber areas. The '941 patent also teaches that unstretched nonwoven webs that are extrusion laminated to single ply polymeric films are susceptible to pinholes caused by fibers extending generally vertically from the plane of the fiber substrate and, accordingly, this patent discloses using multiple co-extruded film plies to prevent pinhole problems. Furthermore, methods for bonding loose nonwoven fibers to polymeric film are disclosed in U.S. Pat. Nos. 3,622,422; 4,379,197 and 4,725,473.

It has also been known to stretch nonwoven fibrous webs using intermeshing rollers to reduce basis weight and examples of patents in this area are U.S. Pat. Nos. 4,153,664 and 4,517,714. The '664 patent discloses a method of incremental cross direction (CD) or machine direction (MD) stretching nonwoven fibrous webs using a pair of interdigitating rollers to strengthen and soften nonwoven webs. The '664 patent also discloses an alternative embodiment wherein the nonwoven fibrous web is laminated to the thermoplastic film prior to intermesh stretching.

Efforts have also been made to make breathable nonwoven composite barrier fabrics which are impervious to liquids, but which are permeable to water vapor. U.S. Pat. No. 5,409,761 is an example of a fabrication process from the patent art. According to this '761 patent, a nonwoven composite fabric is made by ultrasonically bonding a microporous thermoplastic film to a layer of nonwoven fibrous thermoplastic material. These methods and other methods of making breathable laminates of nonwoven and thermoplastic materials tend to involve expensive manufacturing techniques and/or expensive raw materials.

Notwithstanding the extensive development of the art for making plastic films, breathable microporous films and laminates to provide air and moisture vapor permeabilities with liquid-barrier properties, further improvements are needed. In particular, improvements are desired for producing microporous film products and nonwoven laminates on high-speed production machinery without draw resonance. Also, in extrusion lamination of film and nonwoven webs, it has been difficult to achieve target bond levels at high speeds while maintaining the appearance of fabric and soft feel.

SUMMARY OF THE INVENTION

This invention is directed to a method of making plastic films, microporous thermoplastic films and laminates. The method is particularly advantages for operating on high-speed production machinery without draw resonance.

The method involves melting a thermoplastic composition and slot-die extruding a web of that composition through a cooling zone into a nip of rollers to form a film at a speed of at least about several hundred feet per minute (fpm). A stream of cooling gas (air) is directed at the web during its drawdown into a film. The air flow through the cooling zone is substantially parallel to the surface of the web to cool the web and form a film without draw resonance.

In the preferred form of the method, the effectiveness of the cooling gas is enhanced by creating a plurality of vortices of the gas as the stream moves through the zone to cool the web. The vortices enhance the effectiveness of the cooling gas by mixing the cooling gas and making the flow of the cooling gas turbulent in the cooling zone. A cooling device is used to create the vortices and make the gas stream move in different directions parallel to the movement of the web. Alternatively, the gas stream moves primarily in the same direction as the web movement or in a direction opposite to the movement of the web.

In the slot die extrusion lamination of the plastic web or film to a nonwoven fibrous web, a nonwoven fibrous web is introduced into the nip of rollers and the lamination temperature is controlled by the cooling gas to control target bond levels at high speeds of extrusion lamination. For example, target bond levels between the plastic film and the nonwoven web are achieved at speeds in excess of about 500 fpm even up to about 1200 fpm, or more. Target bond levels of, for example, 100 gms/cm between the film and nonwoven are achieved at line speeds on the order of 900 fpm for commercial purposes. The compressive force between the web and the film at the nip is controlled to bond the surface of the web to form a laminated sheet. Furthermore, even at high line speeds the film gauge is controlled without draw resonance. For example, a fixed film basis weight of about 40 grams per square meter (gsm) is achieved at 900 fpm. Thus, the method of cooling eliminates draw resonance which otherwise may normally be encountered under such conditions.

In another form of the invention, microporous thermoplastic films which are permeable to air and water vapor, but are a barrier to liquid, are produced. These breathable films or laminates of these films with nonwoven substrates are also produced at high speeds according to the method of this invention. In this form of the invention, a microporous formable thermoplastic composition is blended comprising a thermoplastic polymer and filler particles. Upon slot-die extrusion of such composition, followed by applying a stretching force to the film at high speeds along lines substantially and uniformly across the film and throughout its depth, a microporous film is formed. Breathable laminates are made when a nonwoven fibrous web is laminated to the film during the extrusion. The effectiveness of the cooling gas is enhanced by creating a plurality of vortices of the gas as the stream moves through the cooling zone to cool the web during extrusion lamination. Thereafter, preferably an incremental stretching force is applied to the film or the laminate at high speeds substantially and uniformly across the film and throughout its depth to provide a microporous film or laminate of film and nonwoven. Tentering may also be used to stretch the film or laminate.

Other benefits, advantages and objectives of this invention will be further understood with reference to the following detailed description.

DETAILED DESCRIPTION OF THE INVENTION

It is a primary objective of this invention to produce plastic films, microporous films, and laminated products thereof with nonwoven fibrous webs, on high-speed production machinery. It is the further objective of the method to produce such films and laminated products of regular gauge without draw resonance. In the case of the microporous products, it is desired to produce breathable or microporous films and laminates with fibrous webs. It is another objective to produce such laminates having satisfactory bond strengths while maintaining the appearance of a fabric or cloth having suitable moisture vapor transmission rates and air permeability while maintaining liquid-barrier properties.

In a preferred mode, the high speed method of making a microporous thermoplastic film involves melt blending a composition comprising (a) about 30% to about 45% by weight of a linear low density polyethylene (LLDPE), (b) about 1% to about 10% by weight of a low density polyethylene (LDPE), and (c) about 40% to about 60% by weight calcium carbonate filler particles of about 0.1 to 1 micron.

The melt-blended composition is slot-die extruded as a web through a cooling zone into a nip of rollers to form a film at speeds in the order of about 500 to about 1200 fpm without draw resonance. A device for directing a stream of cooling gas to flow in the cooling zone substantially parallel to the web surface is shown, for example, in U.S. Pat. Nos. 4,718,178 and 4,779,355. The entire disclosure of these patents is incorporated herein by reference as examples of devices which may be employed to provide enhanced effectiveness of the cooling gas by creating a plurality of vortices of the gas as the stream moves through the cooling zone to cool the web. Thereafter, an incremental stretching force is applied to the film at high speeds along lines substantially and uniformly across the film and throughout its depth to provide a microporous film.

The blend of LLDPE and LDPE within the above approximate ranges of components enables the production of microporous film at high speed when balanced with the prescribed amount of calcium carbonate. In particular, the LLDPE is present in an amount of about 30% to about 45% by weight in order to provide a sufficient amount of matrix to carry the calcium carbonate filler particles thereby enabling the film to be handled and stretched without pin holing and breakage. The LDPE in an amount of about 1% to about 10% by weight also contributes to the production of film without pin holing and enables the high speed production without draw resonance. The polymeric matrix is balanced with an amount of about 40% to about 60% by weight of calcium carbonate particles having an average particle diameter of preferably about 1 micron to achieve a sufficient moisture vapor transmission rate (MVTR) in the range of about 1000 gms/m$^2$/day to 4000 gms/m$^2$/day. Furthermore, the melt-blended composition may include a triblock polymer in an amount of about 0% to about 6% by weight to facilitate stretching in high-speed production without breakage. Other components such as about 5% by weight high density polyethylene (HDPE) and about 1% by weight antioxidants/processing aids are used. An incremental stretching force may be applied in line to the formed film under ambient conditions or at an elevated temperature at speeds of about several hundred fpm along lines substantially uniformly across the film and throughout it depth to provide a microporous film.

As stated above, the method of this invention also involves making film without draw resonance which is not microporous. In this manner, the above film compositions are extruded without the filler which is responsible for the microporosity. When either the film extrudate or microporous-formable extrudate is laminated to a nonwoven fibrous web during extrusion, the extrusion lamination is conducted at the same high speeds. For instance, a nonwoven fibrous web is introduced into the nip of rollers along with the microporous-formable thermoplastic extrudate at 500 to 1200 fpm. The compressive force between the fibrous web and the extrudate is controlled to bond one surface of the web to the film and form a laminate. The laminate is then incrementally stretched along lines substantially uniformly across the laminate and throughout its depth to render the film microporous. The laminate may be stretched in both the cross direction (CD) and the machine direction (MD) to provide breathable cloth-like liquid barriers capable of transmitting moisture vapor and air.

A. Materials for the Method

The thermoplastic polymer for the film preferably is of the polyolefin type and may be any of the class of thermoplastic polyolefin polymers or copolymers that are processable into a film or for direct lamination by melt extrusion onto the fibrous web. A number of thermoplastic copolymers suitable in the practice of the invention are of the normally-solid oxyalkanoyl polymers or dialkanoyl polymers represented by poly(caprolactone) blended with polyvinylalcohol or starch polymers that may be film-formed. The olefin based polymers include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins. Other examples of polymers suitable for use as films include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber. This new class of rubber-like polymers may also be employed and they are generally referred to herein as metallocene polymers or polyolefins produced from single-cite catalysts. The most preferred catalysts are known in the art as metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly(ethylene-octene), poly(ethylene-propylene), and/or polyolefin terpolymers thereof.

The microporous-formable film composition can be achieved by formulating a thermoplastic polymer with suitable additives and pore-forming fillers to provide an extrudate or film for lamination with the nonwoven web. Calcium carbonate and barium sulfate particles are the most common fillers. Microporous-formable compositions of polyolefins, inorganic or organic pore-forming fillers and other additives to make microporous sheet materials are known. This method may be done in line and provides economies in manufacturing and/or materials over known methods of making laminates. In addition, as developed above, microporous-formable polymer compositions may be obtained from blends of polymers such as a blend of an alkanoyl polymer and polyvinyl alcohol as described in U.S. Pat. No. 5,200,247. In addition, blends of an alkanoyl polymer, destructured starch and an ethylene copolymer may be used as the microporous-formable polymer composition as described in U.S. Pat. No. 5,407,979. With these polymer blends, it is unnecessary to use pore-forming fillers to provide microporosity upon incremental stretching. Rather, the different polymer phases in the film themselves, when the film is stretched at ambient or room temperature, produce microvoids.

The nonwoven fibrous web may comprise fibers of polyethylene, polypropylene, polyesters, rayon, cellulose, nylon, and blends of such fibers. A number of definitions have been proposed for nonwoven fibrous webs. The fibers are usually staple fibers or continuous filaments. As used herein "nonwoven fibrous web" is used in its generic sense to define a generally planar structure that is relatively flat, flexible and porous, and is composed of staple fibers or continuous filaments. For a detailed description of nonwovens, see "Nonwoven Fabric Primer and Reference Sampler" by E. A. Vaughn, Association of the Nonwoven Fabrics Industry, 3d Edition (1992).

In a preferred form, the microporous laminate employs a film having a gauge or a thickness between about 0.25 and 10 mils and, depending upon use, the film thickness will vary and, most preferably, in disposable applications is the order of about 0.25 to 2 mils in thickness. The nonwoven fibrous webs of the laminated sheet normally have a weight of about 5 grams per square yard to 75 grams per square yard preferably about 20 to about 40 grams per square yard. The composite or laminate can be incrementally stretched in the cross direction (CD) to form a CD stretched composite. Furthermore, CD stretching may be followed by or preceded by stretching in the machine direction (MD) to form a composite which is stretched in both CD and MD directions. As indicated above, the microporous films or laminates may be used in many different applications such as baby diapers, baby training pants, catamenial pads and garments, and the like where moisture vapor and air transmission properties, as well as fluid barrier properties, are needed.

B. Stretchers for the Microporous-Formable Laminates

A number of different stretchers and techniques may be employed to stretch the starting or original laminate of a nonwoven fibrous web and microporous-formable film. These laminates of nonwoven carded fibrous webs of staple fibers or nonwoven spun-bonded fibrous webs may be stretched with the stretchers and techniques described as follows:

1. Diagonal Intermeshing Stretcher

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

A drive means is typically utilized to drive the stationery intermeshing roll. If the upper intermeshing roll is to be disengageable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addenda of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 Diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal, CD or MD intermeshing stretchers may be employed to produce the incrementally stretched laminate of nonwoven fibrous web and microporous-formable film to form the microporous laminate of this invention. The stretching operation is usually employed on an extrusion laminate of a nonwoven fibrous web of staple fibers or spun-bonded filaments and microporous-formable thermoplastic film. In one of the unique aspects of this invention a laminate of a nonwoven fibrous web of spun-bonded filaments may be incrementally stretched to provide a very soft fibrous finish to the laminate that looks like cloth. The laminate of nonwoven fibrous web and microporous-formable film is incrementally stretched using, for instance, the CD and/or MD intermeshing stretcher with one pass through the stretcher with a depth of roller engagement at about 0.025 inch to 0.120 inch at speeds from about 200 fpm to 500 fpm or faster. The results of such incremental or intermesh stretching produces laminates that have excellent breathability and liquid-barrier properties, yet provide superior bond strengths and soft cloth-like textures.

The following example illustrates the method of making films and laminates of this invention. In light of the example and this further detailed description, it is apparent to a person of ordinary skill in the art that variations thereof may be made without departing from the scope of this invention.

BRIEF DESCRIPTION OF THE DRAWINGS

The invention is further understood with reference to the drawings in which.

EXAMPLE

Blends of LLDPE, LDPE and HDPE having the compositions reported in the following TABLE were extruded to form films and the films were then incrementally stretched to provide microporous films.

TABLE

| Formulation (by wt.): | |
|---|---|
| $CaCO_3$ | 45 |
| LLDPE | 41 |
| LDPE | 5 |
| HDPE | 5 |
| $TiO_2$ | 3 |
| Antioxidant/processing aid | 1 |
| Basis Weight (gms/m²) | 40 |
| Gauge (mils) | 1.2 |
| Line Speed (fpm) | 900 |
| ACD No. 1 (cfm/foot) | 68 |
| ACD No. 2 (cfm/foot) | 113 |
| Web Stability | Good, without draw resonance |

Figure 1:
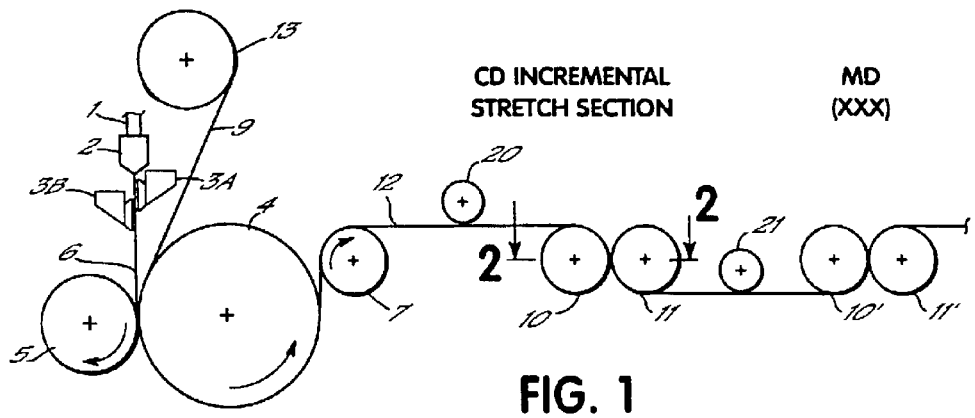
FIG. 1 is a schematic of an in line extrusion lamination and incremental stretching apparatus for making the microporous laminate of this invention.
Figure 2:
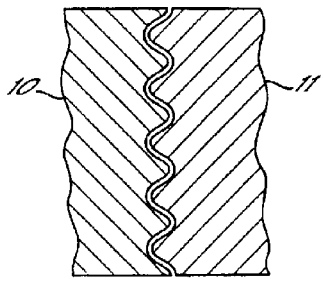
FIG. 2 is a cross sectional view taken along the line 2—2 of FIG. 1 illustrating the intermeshing rollers in diagrammatic form.

The formulation of the TABLE was extruded into films employing an extrusion apparatus as shown diagramatically in FIG. 1. As shown, the apparatus may be employed for film extrusion with and without lamination. In the case of film extrusion, the formulation of the EXAMPLE was fed from an extruder 1 through slot die 2 to form the extrudate 6 into the nip of a rubber roll 5 and a metal roll 4 with two air cooling devices (ACD), ACD No. 1 and ACD No. 2. Shown by numbers 3A and 3B on the drawing. Where extrusion lamination is practiced, there is an incoming web of fibrous material 9 from roller 13 which is also introduced into the nip of the rubber roll 5 and metal roll 4. In the EXAMPLE, the thermoplastic film was produced for subsequent incremental stretching to form the microporous film. As shown in the TABLE, a polyethylene film 6 on the order of about 1.2 mils in thickness was made at a speed of about 900 fpm, which was taken off at roller 7. The ACDs have dimensions approximating the web width with a sufficient manifold sized to deliver the cooling air. These ACDs are described in more detail in the above mentioned U.S. Pat. Nos. 4,718,178 and 4,779,355 patents. The air velocity blown through the nozzle of ACD 3A and against the extrudate 6 is about 4000 fpm at the exit of the nozzle, and air volume is 68 cfm per foot. The air velocity of ACD 3B is about 6800 fpm at the exit of the nozzle, and the air volume is 113 cfm per foot. The ACD 3A is located about 3.7 inches (95 mm) from the die and about 1 inch (25 mm) from the web 6. The ACD 3B is located on the opposite side of the web 6 about 11.2 inches (2.85 mm) from the die and about 0.6 inches (15 mm) from the web. The nip of the rubber roll 5 and metal roll 4 is located about 29 inches (736 mm) from the die. The compressive force at the nip and the ACDs are controlled such that the film is made without pin holing and without draw resonance. The melt temperatures from the slot die feed zone to the screw tip of extruders A and B (not shown) were maintained to provide an extrudate temperature of about 243° C. with cooling gas from the ACDs 3A and 3B decreasing the web temperatures to 211° C.–181° C. before entering the nip.

As shown schematically in FIG. 1, where the incoming film 12 at ambient temperature was passed through temperature controlled rollers 20 and 21 before CD and MD incremental stretching rollers (10 and 11, and 10' and 11'), the temperatures and the depths of engagements can be controlled. In brief, moisture vapor transmission rates (MVTRs) for the embossed film on the order of about 1200–2400 gms/m²/day were achieved. The MVTR of the microporous film can also be controlled by the web temperature during the stretching. When the film is heated to different temperatures before CD stretching, different MVTRs can result. The embossed film was made with a metal embossing roller having a rectangular engraving of CD and MD lines with about 165–300 lines per inch. This pattern is disclosed, for example, in U.S. Pat. No. 4,376,147 which is incorporated herein by reference. This micro pattern provides a matte finish to the film but is undetectable to the naked eye.

Figure 3:
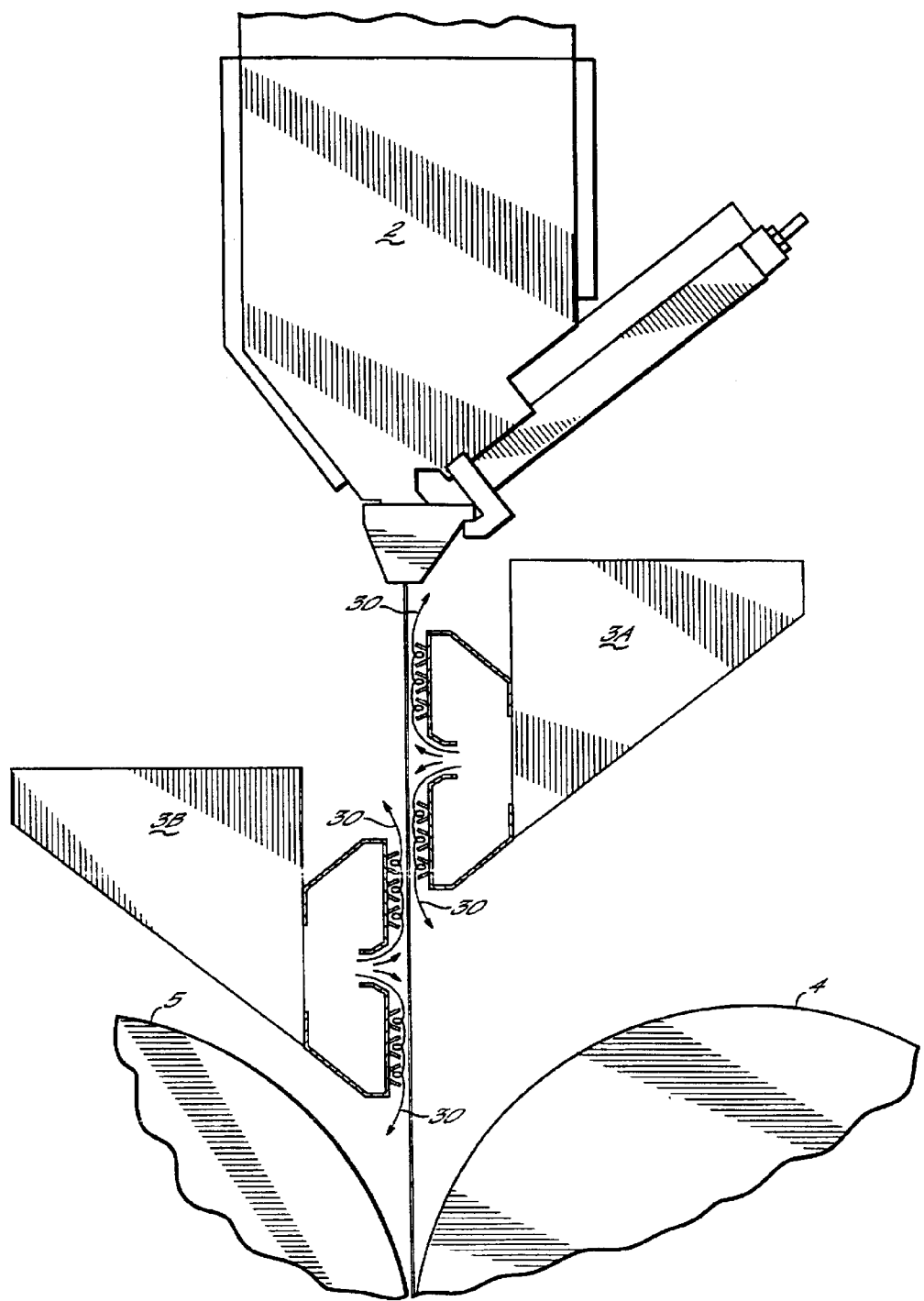
FIG. 3 is an enlarged view of the die, cooling devices and embossing rollers arrangement, showing the substantially parallel air flow with vortices.

FIG. 3 is an enlarged schematic of the die 2, ACDs 3A,3B and embossing rollers arrangement showing the air flows 30 on both sides of the web substantially parallel to the web surface with a plurality of vortices on both sides of the web. A slight offset of cooling devices 3A and 3B has been shown to provide cooling; however, different arrangements may be used.

It has been found that ACDs of the type illustrated which provide a substantially parallel cooling air flow with vortices over the web surface efficiently cool the web. Surprisingly, web draw resonance which one may normally encounter in prior techniques has been eliminated or controlled at high speeds of about 500–1200 fpm of the web. Furthermore, when laminates of film and nonwoven are made, the bond strengths are very effectively achieved at targets which have not been possible with other known methods of cooling while at the same time maintaining film gauge controls, even at web high speeds.

In view of the above detailed description, it will be understood that variations will occur in employing the principles of this invention depending upon materials and conditions, as will be understood by those of ordinary skill in the art.

What is claimed is:

1. A high speed method of making a thermoplastic film comprising melting a thermoplastic composition, extruding a web of said molten thermoplastic composition from a slot die through a cooling zone into a nip of rollers to form a film at a speed on the order of at least about 500 fpm to about 1200 fpm, employing a first and a second cooling device which are offset on opposite sides of said web between said slot die and said nip of rollers, each said cooling device for directing a stream of cooling gas to flow through said zone substantially parallel to the surface of said web to cool the web and form a film without draw resonance, and each said cooling device for enhancing the cooling effectiveness of said cooling gas by creating a plurality of vortices of said gas as the stream moves through said zone to cool the web.

2. The method of claim 1 wherein each gas stream moves in the same direction as the web movement.

3. The method of claim 1 wherein each gas stream moves in different directions parallel to the movement of the web.

4. The method of claim 1 wherein each gas stream moves in a direction opposite to the movement of the web.

5. The method of claim 1 wherein the thermoplastic composition is formed by melt blending a thermoplastic polymer and filler particles to form a microporous formable thermoplastic polymer composition, and applying a stretching force to the film at said speed along lines substantially and uniformly across the film and throughout its depth to provide a microporous film.

6. The method of claim 1 wherein the composition comprises
    (a) about 30% to about 45% by weight of a linear low density polyethylene,
    (b) about 1% to about 10% by weight of a low density polyethylene,
    (c) about 40% to about 60% by weight calcium carbonate filler particles.

7. The method of claim 6 wherein said melt blended composition consists essentially of about 41% by weight linear low density polyethylene, about 5% by weight low density polyethylene, about 45% by weight calcium carbonate filler particles, and about 5% by weight high density polyethylene.

8. The method of claim 7 wherein said melt blended composition further comprises about 3% by weight titanium dioxide and about 1% by weight antioxidant/processing aid.

9. The method of claim 1 wherein said nip of rollers comprises a metal embossing roller and a rubber roller and the compresive force between said rollers is controlled to form an embossed film.

10. The method of claim 1 wherein the melt blended composition comprises a thermoplastic polymer containing a dispersed phase of particles selected from the group consisting of an inorganic filler and an organic material and a method comprising the further step of stretching the film to form a microporous sheet.

11. The method of claim 1 comprising the further step of stretching a film at said speed to provide a microporous film.

12. The method of claim 1 wherein the film has a thickness on the order of about 0.25 to about 10 mils.

13. The method of claim 5 wherein said incremental stretching step is conducted at ambient temperature.

14. The method of claim 5 wherein said incremental stretching step is conducted at elevated temperature.

15. The method of claim 1 wherein said thermoplastic composition is a polymer selected from the group consisting of polyethylene, polypropylene, and copolymers thereof.

16. A high speed method of making a microporous thermoplastic film comprising
    melt blending a composition of
        (a) about 30% to about 45% by weight of a linear low density polyethylene,
        (b) about 1% to about 10% by weight of a low density polyethylene,
        (c) about 40% to about 60% by weight calcium carbonate filler particles,
    extruding a web of said melt blended composition through a cooling zone into a nip of rollers to form a film at a speed on the order of at least about 500 fpm to about 1200 fpm,
    employing a first and a second cooling device which are offset on opposite sides of said web between said slot die and said nip of rollers,
    each said cooling device for directing a stream of cooling air to flow through said zone substantially parallel to said web surface to cool the web and form a film without draw resonance, and
    each said cooling device for enhancing the cooling effectiveness of said cooling gas by creating a plurality of vortices of said gas as said stream moves through said zone to cool the web.

17. The method of claim 16 comprising the further step of applying an incremental stretching force to said film at said speed along lines substantially and uniformly across said film and throughout its depth to provide a microporous film.

18. The method of claim 16 wherein said melt composition further contains high density polyethylene and titanium dioxide.

19. The method of claim 18 wherein the high density polyethylene is contained in an amount of 5% by weight and the titanium dioxide is contained in an amount of about 3% by weight.

20. The method of claim 16 wherein said incremental stretching step is conducted at ambient temperature.

21. The method of claim 16 wherein said incremental stretching step is conducted at an elevated temperature.

* * * * *